United States Patent [19]

Jonsson et al.

[11] Patent Number: 5,026,535

[45] Date of Patent: Jun. 25, 1991

[54] METHOD FOR DECOLORING SULPHURIC ACID DERIVING FROM ACID PRODUCTION PROCESSES

[75] Inventors: Jan L. Jonsson, Skellefteå ; Sten A. Nilsson, Ursviken, both of Sweden

[73] Assignee: Boliden Contech AB, Stockholm, Sweden

[21] Appl. No.: 423,361

[22] Filed: Oct. 18, 1989

[30] Foreign Application Priority Data

Nov. 16, 1988 [SE] Sweden .................................. 8804123

[51] Int. Cl.$^5$ ......................... C01B 17/90; C01B 17/76
[52] U.S. Cl. ..................................... 423/525; 423/523;
423/531; 423/513
[58] Field of Search ............... 423/522, 531, 523, 525,
423/513; 208/13; 210/759

[56] References Cited

U.S. PATENT DOCUMENTS

| | | | |
|---|---|---|---|
| 3,856,673 | 12/1974 | De La Mater et al. | 423/531 |
| 4,045,295 | 8/1977 | Schafer et al. | 423/531 |
| 4,085,016 | 4/1978 | Janjua et al. | 423/531 |
| 4,157,381 | 6/1979 | Bodenbenner et al. | 423/531 |
| 4,591,494 | 5/1986 | Cameron et al. | 423/522 |

FOREIGN PATENT DOCUMENTS

| | | |
|---|---|---|
| 0027607 | 10/1980 | European Pat. Off. . |
| 0117986 | 1/1984 | European Pat. Off. . |
| 1067793 | 10/1959 | Fed. Rep. of Germany . |
| 58-32003 | 2/1983 | Japan . |
| 1380692 | 1/1975 | United Kingdom . |

OTHER PUBLICATIONS

Olsen, *Unit Processes and Principles of Chemical Engineering*, P. Van Nostrand Co., Inc., 1932, pp. 1–3.
Abstract of German Patent 1067793, German Patents Gazette.

*Primary Examiner*—Gary P. Straub
*Assistant Examiner*—Stephen G. Kalinchak
*Attorney, Agent, or Firm*—Burns, Doane, Swecker & Mathis

[57] ABSTRACT

The present invention relates to a method for decoloring sulphuric acid produced in accordance with the contact method, comprising one or more absorption circuits. The produced sulphuric acid is decolored by adding hydrogen peroxide to the system. The method is characterized by adding the hydrogen peroxide to the sulphuric acid in the final absorption circuit, and by maintaining the temperature in this circuit above about 70° C.

17 Claims, No Drawings

METHOD FOR DECOLORING SULPHURIC ACID DERIVING FROM ACID PRODUCTION PROCESSES

The present invention relates to a method for decolouring sulphuric acid produced in accordance with the contact method, comprising one or more absorption circuits and the addition of hydrogen peroxide to the resultant sulphuric acid, for the purpose of decolouring the same.

Process gases led to sulphuric acid plants often contain contaminants, in greater or lesser quantities, inter alia saturated and non-saturated carbon compounds, resulting in discolouration of the sulphuric acid produced. This discolouration of the acid has several causes. For example, discolouration may be caused from oil present in the seals of dust separators in the process-gas purification system, oil-containing waste present in the processes from which the gases derive, combustion gases deriving from thick oil used for heating process apparatus, or even coal particles used for this purpose, and residues of different flotation agents in treated ore concentrate.

Several methods for decolouring sulphuric acid are known to the art. These methods include the addition of oxidants, such as potassium permanganate, hydrogen peroxide and ozone, by electrolytic oxidation and with the aid of activated carbon. Such oxidants as potassium permanganate and ozone are expensive and present many problems in practice. Potassium permanganate is not readily dissolvable in water, resulting in a decrease in the concentration of the acid when potassium permanganate is added. Furthermore, the presence of the manganese residues also presents a risk of renewed discolouration. Ozone is a chemical which has a harmful effect when inhaled, even at extremely low levels. The process of electrolytic oxidation requires the use of extremely complicated apparatus and the costs involved by this method are so high that the method has not been used anywhere for decolouring purposes. Neither are decolouring methods which use activated carbon fully satisfactory in practice, because the technical effect of such methods is in doubt. The components of many carbon qualities result in a certain degree of discolouration.

Consequently, the only known discolouration method acceptable in practice is one in which hydrogen peroxide is added to the sulphuric acid produced. This method is, at present, the standard method proposed by the suppliers of contact sulphuric-acid plants. This method requires the addition of hydrogen peroxide to a pump receiver located downstream of the last absorption stage of the system, but upstream of the tanks in which the sulphuric acid produced is stored, in which pump receiver the concentration of the sulphuric acid can fluctuate between 94 and 97% and in which the temperature is normally about 60°-70° C. It has been found, however, that this known standard method for decolouring sulphuric acid is not sufficiently effective, and that at times sulphuric acid will be heavily darkened, despite the addition of hydrogen-peroxide in excess quantities. The addition of excess quantities of hydrogen peroxide also results in the presence of peroxide residues in the acid, which renders the acid unacceptable to many consumers. This complicates the marketing situation, since the possibilities of depositing darkly-coloured acids are very limited and the drop in turnover is accordingly quite significant. In principle, darkly-coloured acid is accepted solely for the manufacture of fertilizers. An increase in the temperature of production acid for the purpose of accelerating the reaction has been found to result in problems relating to the corrosion of material in the pumps and conduits of the plant apparatus, making it necessary to also cleanse the acid from corrosion products.

The Japanese company Mitsubishi has proposed a method of improving decolouration of sulphuric acid with hydrogen peroxide, and of rendering such methods more effective. The acid produced is decoloured in a plant comprising three, Teflon-lined tanks mutually connected in series. The plant is dimensioned to provide an acid stay-time of about 30 min in each tank. The coloured acid is first steam heated to about 105° C. and pumped to the bottom of the first tank, subsequent to having been admixed with hydrogen peroxide in the form of a ca 35-percent solution. Subsequent to passing through the tanks, the acid is cooled in a cooler to a suitable temperature, prior to being conducted to the storage tanks.

Although the Mitsubishi method would appear to be effective for decolouring acids, it is not an attractive method for practical use in the majority of cases. The method is complicated and the necessity to install additional tanks for decolouring the product acid coupled with the necessity to provide heat exchangers and coolers both upstream and downstream of the decolouring units adds greatly to the costs.

Consequently, there is a need for an effective decolouring method which can be used with existing contact sulphuric-acid plants, and which can be carried out without appreciable additional investment costs and operating costs, and which will not add to environmental or working hazards or contamination of the sulphuric acid produced.

It has now surprisingly been found possible to provide a method for decolouring sulphuric acid produced from acid production processes which fulfills the above desiderata and requirements placed on the production of sulphuric acid, as discussed in the aforegoing. The inventive method is characterized by the process steps set forth in the following claims.

Thus, in accordance with the novel method hydrogen peroxide is introduced to sulphuric acid circulating in the final absorption circuit, while maintaining the acid at a temperature of above about 70° C. The concentration of the sulphuric acid in the absorption circuits is an important criterium for effective absorption, and is always maintained within the narrowest of limits, and is preferably above 98.3%, normally close to 99%.

The temperature in the absorption circuit when decolouring the acid is preferably maintained within a range of 80°-100° C.

The addition of hydrogen peroxide to the absorption circuit provides the advantage of an increased stay time with respect to $H_2O_2$.

It has been found that an advantage is gained when the hydrogen peroxide is added in a finely divided state, for instance through spray-type metering pipes.

The hydrogen peroxide addition is advantageously controlled automatically with respect to the acid produced.

Thus, it is possible to monitor the decolouring effect continuously, and therewith determine the amount of peroxide that needs to be added. It has also been found advantageous to thoroughly agitate or stir the acid at the time of adding peroxide to the system.

The hydrogen peroxide can be added together with other flows entering the final absorption stage, for instance sulphuric acid from other stages in the process. The peroxide can also be added in the form of chemicals compounds from which peroxide is released when coming into contact with sulphuric acid, for instance peroximonosulphuric sulphuric acid, even though the addition of peroxide in this form is less effective than when adding peroxide itself.

Normally, in order to achieve satisfactory colour reduction of the acid while ensuring, at the same time, that no traceable quantities of residual peroxide remain, it is necessary to introduce peroxide in dosages of 0.5–0.6 kg $H_2O_2$/tonne sulphuric acid is here calculated as 100% $H_2O_2$). The amount of $H_2O_2$ required is contingent, inter alia, on the degree of discolouration of the acid.

The invention will now be described in more detail, partly with reference to working examples.

Blackening of sulphuric acid can be measured in different ways, one standard method being the so-called APHA-method, in which the results are designated "colour index" and are given APHA or mg Pt/l.

EXAMPLE 1

In a sulphuric acid plant, in which decolouring was effected with hydrogen peroxide introduced to a pump receiver located downstream of the final absorption stage, but before the acid storage tanks, a progressively higher colour index was obtained, despite increasing the normal dosage of hydrogen peroxide. An attempt was made to improve the colour index, by changing the operating conditions of the roasting processes from which the sulphur dioxide gas originated. Among other things, changes were made to the quantities and qualities of the various roasting materials treated. None of the measures taken improved the acid colour index, however. By changing the location at which hydrogen peroxide was introduced to the system, from said pump receiver, in which the concentration of $H_2SO_4$ was 94–97% and the temperature 60°–70° C., to the acid receiver in the final absorption circuit, where the sulphuric-acid concentration was 98.5% and the temperature 70°–80° C., a considerable improvement in acid quality was obtained immediately, in that the colour index fell from an average of 1140 mg Pt/l (with certain peaks up to about 4000 mg Pt/l) down to 400 mg Pt/l. In order to improve the contact between hydrogen peroxide and sulphuric acid still further, a separate metering pipe made of Teflon was placed in the nozzle system or arrangement. As a result, the colour index fell to 50–200 mg Pt/l, this level being maintained for three production months. The temperature range of the final absorption acid was then raised from 70°–80° C. to 80°–100° C., wherewith the colour index fell further to 15–50 mg Pt/l. An acid having a colour index of 50 APHA is discerned as colourless by the human eye.

EXAMPLE 2

Absorption sulphuric acid containing 98.9% $H_2SO_4$ and having a colour index of 1250 APHA was treated with 50% hydrogen-peroxide solution at mutually different temperatures, reaction times and in mutually different dosages, in order to establish the kinetics taking place when decolouring with hydrogen peroxide. The object was to achieve satisfactory colour reduction together with a residual content of $H_2O_2 \sim 0$. Some results typical of the experiments are shown in Tables 1 and 2 below, in which $H_2O_2$ is calculated as 100% $H_2O_2$.

TABLE 1

Colour index and residual contents $H_2O_2$ when metering 0.6 kg $H_2O_2$ per tonne H to the system at 100° C.

| Time | With agitation | | Without agitation | |
| min | APHA | $H_2O_2$ g/l | APHA | $H_2O_2$ g/l |
| --- | --- | --- | --- | --- |
| 5 | 50 | 0.25 | 100 | 0.3 |
| 20 | 40 | 0.02 | 50 | 0.05 |
| 40 | 40 | 0.01 | 40 | 0.02 |
| 60 | 40 | 0 | 40 | 0 |

TABLE 2

Colour index and residual contents $H_2O_2$ at varying temperatures and $H_2O_2$-additions

| Temp °C. | Time min | $H_2O_2$ kg/tonne | Residual $H_2O_2$ g/l | Colour index APHA |
| --- | --- | --- | --- | --- |
| 80 | 5 | 0.3 | | 650 |
| | 20 | " | | 435 |
| | 40 | " | | 260 |
| | 60 | " | 0.03 | 200 |
| 80 | 5 | 0.6 | | 650 |
| | 20 | " | | 360 |
| | 40 | " | | 260 |
| | 60 | " | 0.3 | 125 |
| 80 | 5 | 0.9 | | 580 |
| | 20 | " | | 290 |
| | 40 | " | | 260 |
| | 60 | " | 0.5 | 100 |
| 90 | 5 | 0.6 | 0.6 | 275 |
| | 20 | " | 0.3 | 100 |
| | 40 | " | 0.1 | 75 |
| | 60 | " | 0.01 | 50 |
| 100 | 5 | 0.4 | 0.2 | 175 |
| | 20 | " | 0.03 | 75 |
| | 40 | " | 0 | 75 |
| | 60 | " | 0 | 75 |
| 100 | 5 | 0.6 | 0.25 | 50 |
| | 20 | " | 0.12 | 40 |
| | 40 | " | 0.01 | 40 |
| | 60 | " | 0 | 40 |

EXAMPLE 3

Experiments corresponding to the experiments of Example 2 were carried out, but with the $H_2O_2$ additions being made in the form of peroximonosulphuric acid (1% by weight $H_2O_2$, 27% by weight H . The resultant reduction in colour was poorer than the colour reduction achieved in corresponding experiments in which hydrogen peroxide was used. When dosing with 0.6 kg $H_2O_2$ in the form of $H_2SO_5$, a colour index of 320 was obtained after 60 minutes. The corresponding colour index obtained when using a pure hydrogen peroxide solution was 125.

We claim:

1. A method for decoloring sulphuric acid produced by the contact method having one or more absorption circuit stages and in which hydrogen peroxide is added for decoloring the sulphuric acid produced, comprising adding the hydrogen peroxide to the sulphuric acid in the final absorption circuit stage, and simultaneously maintaining the temperature in said final stage at above about 70° C.

2. A method according to claim 1, including maintaining the temperature within the range of 80°–100° C.

3. A method according to claim 2, including adding atomized hydrogen peroxide to the sulphuric acid.

4. A method according to claim 3, including automatically controlling the addition of hydrogen peroxide with respect to the produced acid.

5. A method according to claim 4, including agitating or stirring the sulphuric acid when adding hydrogen peroxide thereto.

6. A method according to claim 5, including adding the hydrogen peroxide together with other flows entering the final absorption circuit stage.

7. A method according to claim 1, including adding atomized hydrogen peroxide to the sulphuric acid.

8. A method according to claim 1, including automatically controlling the addition of hydrogen peroxide with respect to the produced acid.

9. A method according to claim 2, including automatically controlling the addition of hydrogen peroxide with respect to the produced acid.

10. A method according to claim 1, including agitating or stirring the sulphuric acid when adding hydrogen peroxide thereto.

11. A method according to claim 2, including agitating or stirring the sulphuric acid when adding hydrogen peroxide thereto.

12. A method according to claim 3, including agitating or stirring the sulphuric acid when adding hydrogen peroxide thereto.

13. A method according to claim 1, including adding the hydrogen peroxide together with other flows entering the final absorption circuit stage.

14. A method according to claim 2, including adding the hydrogen peroxide together with other flows entering the final absorption circuit stage.

15. A method according to claim 3, including adding the hydrogen peroxide together with other flows entering the final absorption circuit stage.

16. A method according to claim 4 including adding the hydrogen peroxide together with other flows entering the final absorption circuit stage.

17. A method according to claim 1, wherein the concentration of sulfuric acid in the final absorption circuit stage is greater than about 98.3% by weight.

* * * * *